United States Patent [19]
Johnson

[11] Patent Number: 5,764,896
[45] Date of Patent: Jun. 9, 1998

[54] METHOD AND SYSTEM FOR REDUCING TRANSFER LATENCY WHEN TRANSFERRING DATA FROM A NETWORK TO A COMPUTER SYSTEM

[75] Inventor: Scott C. Johnson, Williamson County, Tex.

[73] Assignee: Compaq Computer Corporation, Houston, Tex.

[21] Appl. No.: 671,583

[22] Filed: Jun. 28, 1996

[51] Int. Cl.[6] .................................................. G06F 13/00
[52] U.S. Cl. ........................... 395/200.8; 395/200.63; 395/200.65; 395/280; 395/282; 395/872
[58] Field of Search ............................ 395/280, 282, 395/200.2, 872–877, 200.62, 200.63, 200.64, 200.65

[56] References Cited

U.S. PATENT DOCUMENTS

| | | | |
|---|---|---|---|
| 5,297,139 | 3/1994 | Okura et al. | 370/428 |
| 5,307,459 | 4/1994 | Petersen et al. | 395/200.8 |
| 5,434,872 | 7/1995 | Petersen et al. | 371/57.1 |
| 5,606,559 | 2/1997 | Badger et al. | 370/395 |

*Primary Examiner*—Glenn A. Auve
*Assistant Examiner*—Ario Etienne
*Attorney, Agent, or Firm*—Stanford & Bennett

[57] ABSTRACT

A computer system for communicating with a network including a host processor, memory, an interface bus and a network interface device for reducing data transfer latency between the computer system and the network. The network interface device includes a buffer for temporarily storing data, a media interface device for transferring data between the buffer and the network, a bus interface for transferring data between the computer system's memory and the buffer, and a local processor for writing a unique value at a predetermined location within the buffer, for periodically comparing the data value at the predetermined location with the unique value and for initiating data transfer from the buffer to the computer's memory when the data value does not match the unique value. The network interface device is preferably a network interface card (NIC) for plugging into a slot of the interface or expansion bus of the computer system. The local processor writes the unique value at the location and then periodically compares the data at that location with the unique value. When the data value is different from the unique value, the local processor has detected new data in that block of memory. The local processor respondingly initiates data transfer of the new data from that block to the memory of the computer system.

20 Claims, 3 Drawing Sheets

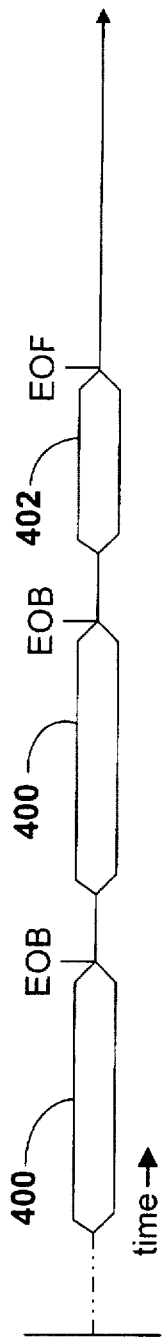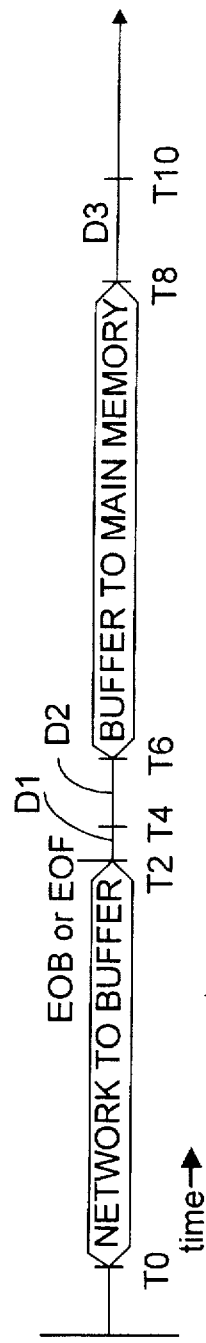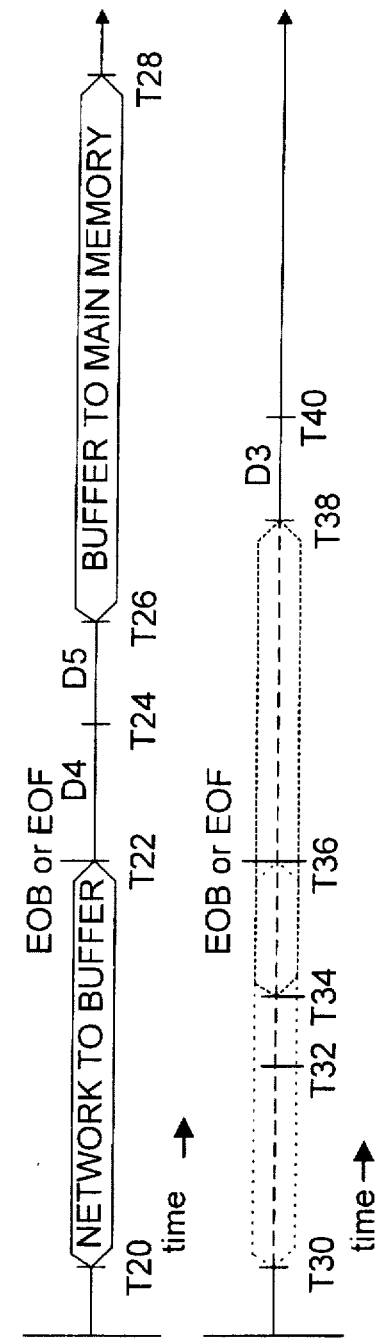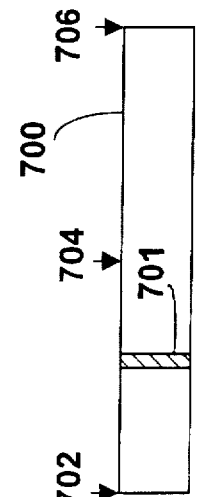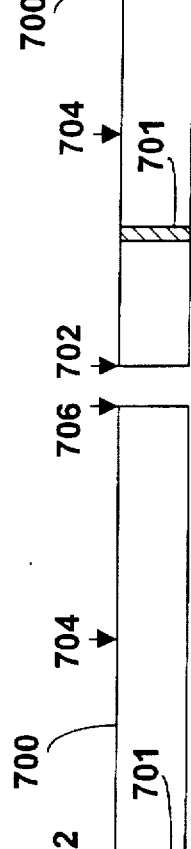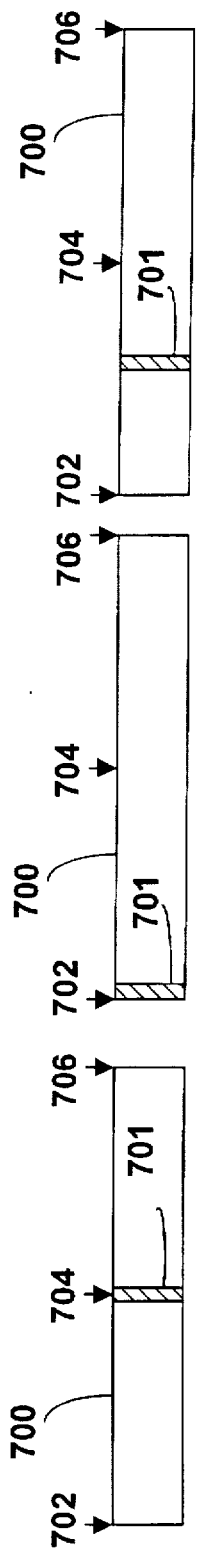
FIG. 4
FIG. 5A (PRIOR ART)
FIG. 5B (PRIOR ART)
FIG. 8
FIG. 7A
FIG. 7B
FIG. 7C

METHOD AND SYSTEM FOR REDUCING TRANSFER LATENCY WHEN TRANSFERRING DATA FROM A NETWORK TO A COMPUTER SYSTEM

FIELD OF THE INVENTION

The present invention relates to the field of networking devices, and more particularly to a method and system for reducing data transfer latency when transferring data from a network to a computer system, thereby providing advance notification of data received from the network.

DESCRIPTION OF THE RELATED ART

There are many different types of networks and network systems for sharing files and resources or for otherwise enabling communication between two or more computers. Networks may be categorized based on various features and functions, such as message capacity, range over which the nodes are distributed, node or computer types, node relationships, topology or logical and/or physical layout, architecture based on cable type and data packet format, access possibilities, etc.

For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc. The architecture of a network generally refers to the cabling or media and media access used as well as the packet structure of the data transmitted across the media. Various architectures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network architecture using coaxial, twisted pair or fiber-optic cables for operation at 2.5 Mbps. IBM Token Ring topologies use special IBM cable or fiber-optic cable for operation at 4 or 16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs) as well as various other devices on the network, such as repeaters, bridges, switches, routers and brouters, to name a few examples.

A network segment is a group of stations that share the same data-link layer using the same data-link layer protocol. The data-link layer is the next layer above the lowest layer of the Open Systems interconnection (OS1) Reference Model, where the lowest layer is referred to as the physical layer. Ownership of the data-link layer is established in accordance with the protocol, but only one station owns the data-link layer at a time. A network operating according to a given communications protocol may be expanded by using one or more repeaters. A repeater is a hardware device that functions at the physical layer and is used to connect two or more stations of the same network. In particular, a repeater receives packets or data from a data device in one station and re-transmits the packets to another station. A bridge is a hardware device that passes packets from one network segment to another. A bridge serves as a filter by dropping packets that need not be relayed to other segments. A switch is similar in function to a multi-port bridge.

A computer system or node typically includes an expansion or input/output (I/O) bus with one or more slots for receiving expansion cards that expand or otherwise add functionality to the computer system. One example is a NIC for enabling the computer to attach to and communicate with a compatible network. The NIC is implemented to support the particular physical media and network protocol desired. For example, a NIC could include an RJ-45 plug for coupling to a twisted-pair cable or a BNC T-connector for coupling to a coaxial cable. The NIC is configured appropriately for interfacing the computer to an Ethernet network, such as 10Base-T or 100Base-TX, or to a token ring network, or to any other type of protocol supported by a network.

Data is typically transferred across network segments in the form of packets or frames. A NIC usually includes a buffer or the like for temporarily storing data transferred between a computer system and a network. A key parameter for determining the performance of data transmission is data transfer latency from the network to the computer system. Latency is a measure of the amount of time or delay to transfer a packet or packet portion to the main memory of the computer, and may further include the additional time to inform the host processor of the transfer, if necessary. In many Ethernet and token ring schemes prior to the present invention, an entire block of data was written into the buffer for temporary storage before being transferred to the main memory. Each block formed a portion of a packet or the entire packet and is typically approximately one kilobyte in length. Transfer of each block from the NIC to the main memory depended upon whether the NIC was capable of performing direct memory access (DMA) data transfers. If so, after a block was written to the buffer of the NIC, the NIC gained control of the expansion bus of the computer and performed a DMA transfer of the block into the computer memory. For memory-mapped configurations, the NIC informed the host processor, usually by interrupt, and the host processor controlled the transfer of the data from the buffer to the computer memory.

Either of these prior art schemes incorporated significant latency. Each block transfer included the time to completely transfer the block to the buffer plus the time to completely transfer the block from the buffer to main memory. For DMA capable systems, additional delays were necessary to configure a bus master device to perform the DMA transfer and to subsequently inform the host processor that the transfer was completed. For memory-mapped systems, additional delays were necessary to inform the host processor that a block of data was in the NIC buffer awaiting transfer, and for the host processor to execute the appropriate routine to perform the transfer. The memory-mapped schemes were less desirable since they further consumed valuable host processor time to transfer each block of data of each packet.

Some Ethernet NICs have been designed to perform pipelining of the data. In brief, the local processor or other hardware began transferring the data to host memory sometime before the entire block was written into the local buffer. This reduced latency since the system did not have to wait until the entire block was written before starting the transfer to host memory. However, the hardware had to be specifically designed to perform pipelining. Mere changes in the firmware driver stored in the local adapter card memory were not sufficient to add pipelining capability.

It is desired to reduce the latency when transferring data from a network to a computer system. It is further desired to provide advance notification to the host processor that data has been received from the network and is loaded into host memory.

SUMMARY OF THE INVENTION

A computer system for communicating with a network according to the present invention includes a host processor, memory, an interface bus and a network interface device for enabling communication between the computer system and the network. The network interface device includes a buffer for temporarily storing data, a media interface device for transferring data between the buffer and the network, a bus interface for transferring data between the computer system's memory and the buffer, and a local processor for writing a unique value at a predetermined location within the buffer, for periodically comparing the data value at the predetermined location with the unique value and for initiating data transfer from the buffer to the computer's memory when the data value does not match the unique value. The network interface device is preferably a network interface card (NIC) for coupling to a slot of the interface or expansion bus of the computer system.

The data transferred between the network and the computer system comprises one or more blocks of data forming a network packet or frame. The buffer of the network interface device includes one or more blocks of memory for storing corresponding blocks of data transferred between the computer system and the network. The unique value may be one byte, but is preferably several non-contiguous or contiguous bytes to ensure uniqueness for identifying when the unique value is overwritten with new data from the network. The predetermined location for one or more blocks of memory is at a convenient location to reduce latency of data transfer, such as in the middle, at the beginning or between the beginning and the middle of each block of memory in the buffer. In this manner, the local processor of the network interface device writes the unique value at the location and then periodically compares the data at the same location with the unique value. When the data value is different from the unique value, the local processor has detected new data in that block of memory. The local processor respondingly initiates data transfer of the new data from that block to the memory of the computer system. In this manner, the data transfer from the buffer of the interface device to the computer's memory begins before the data is completely written into the buffer from the network, thereby reducing latency of data transfer from the network to the computer system.

It is possible that an occasional data block from the network overwrites the unique value with an identical match, so that early detection does not occur. In that case, data transfer occurs when either the end-of-block (EOB) signal or the end-of-frame (EOF) signal is asserted. Although data latency is not reduced for those particular blocks, the percentage of occurrence of such blocks is negligible. Data latency is dramatically reduced in any event.

The network interface device further includes local memory for storing a driver routine, which instructs the processor on the device to write the unique value at the predetermined location within the buffer, to periodically compare the data value at the predetermined location with the unique value and to initiate data transfer from the buffer to the computer memory when the data value does not match or is otherwise different from the unique value. The local processor further indicates to the host processor when the data transfer from the buffer to the computer's memory is complete. Since transfer latency is reduced, the host processor receives advance notice of data from the network as compared to prior art systems.

A method of detecting data sent from a network to a network interface device in a computer system, comprises the steps of writing a predetermined value at a predetermined location of a data buffer of the network interface device, periodically comparing a data value at the predetermined location with the predetermined value, and transferring data from the data buffer to the computer system when the data value at the predetermined location is different from the predetermined value. The method may further include a step of reading the data value at the predetermined location for purposes of comparison. The method may also include a step of indicating to the computer system after the data from the data buffer is transferred, thereby providing advance notification of data transfer.

In this manner, the data transfer latency from a network to a computer system is reduced by an appreciable amount. Also, advance notification is provided to the host processor that data has been received from a network and loaded into host memory.

BRIEF DESCRIPTION OF THE DRAWINGS

A better understanding of the present invention can be obtained when the following detailed description of the preferred embodiment is considered in conjunction with the following drawings, in which:

FIG. 4 is a timing diagram illustrating transfer of several blocks of data across the segment of FIG. 1;

FIGS. 5A and 5B are timing diagrams illustrating prior art schemes for transferring blocks of data across a network segment;

FIGS. 7A-7C illustrate possible locations for a unique value written into one or more blocks of memory in the buffer of FIG. 3; and FIG. 8 is a timing diagram illustrating a system according to the present invention for transferring blocks of data from the network to the memory of the computer system of FIG. 1.

DETAILED DESCRIPTION OF THE PREFERRED EMBODIMENT

Figure 1:
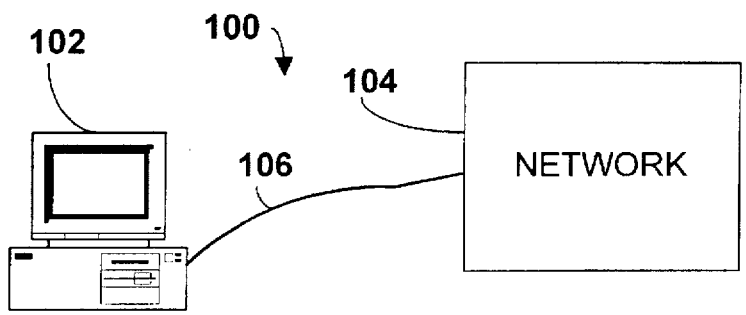
FIG. 1 is a perspective view of a network system implemented according to the present invention including a network and a computer system coupled through a network segment or cable.

Referring now to FIG. 1, a perspective view is shown of a network system 100 implemented according to the present invention, which includes a computer system 102 coupled to a network 104 across a cable segment 106. The network 104 includes one or more network devices or nodes coupled together across one or more cable segments, so that the computer system 102 communicates with the one or more network devices in the network 104 through the cable segment 106. The computer system 102 may be any one of many different types of computer systems known to those skilled in the art, such as a personal computer (PC), a microstation, a mainframe, etc. The cable segment 106 is any type of network physical media, such as coaxial cables, twisted-pair cables, fiber-optic cables for the FDDI (Fiber Distributed Data Interface), etc. The network 104 and the cable segment 106 operate according to any network protocol, such as Ethernet, IBM Token Ring, ARCnet (Attached Resource Computer Network), etc. In the embodiment shown, the network 104 and the cable segment 106 operate according to the token ring protocol or standard.

Figure 2:
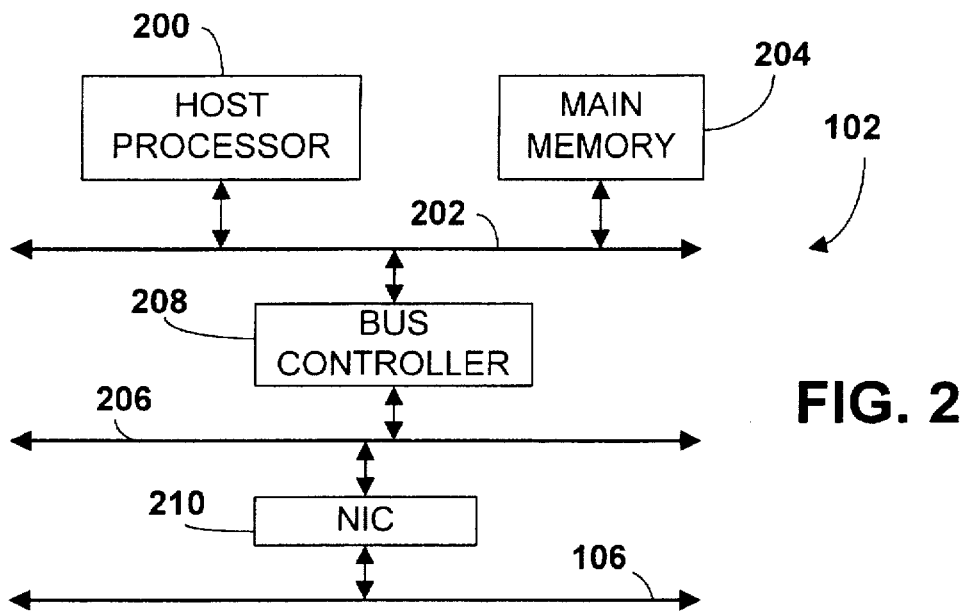
FIG. 2 is a block diagram of the computer system of FIG. 1.

Referring now to FIG. 2, a block diagram is shown of the computer system 102 coupled to the segment 106. The computer system 102 is simplified since complete details are not necessary for a full understanding of the present invention. The computer system 102 includes a host processor 200 coupled to a host bus 202, such as the peripheral component interconnect (PCI) bus or the like, which is also coupled to a host or main memory 204. The main memory 204 may be any one of many forms of random access memory (RAM) or the like, and typically includes a memory controller for interfacing the host bus 202. The computer system 102 further includes an expansion or input/output (I/C) bus 206, such as the industry standard architecture (ISA) or AT bus or the Extended ISA (EISA) bus or the like. The I/O bus 206 is coupled to the host bus 202 through an interface bridge or bus controller 208. The I/O bus 206 typically includes one or more I/O slots (not shown) for receiving plug-in expansion cards for expanding or otherwise adding functionality to the computer system 102. In the embodiment shown, a network interface card (NIC) 210 is plugged into a slot of the I/O bus 206 for interfacing the computer system 102 to the segment 106 and thus to the network 104. In particular, the NIC 210 operates to enable the computer system 102 to communicate with the one or more network devices of the network 104.

Figure 3:
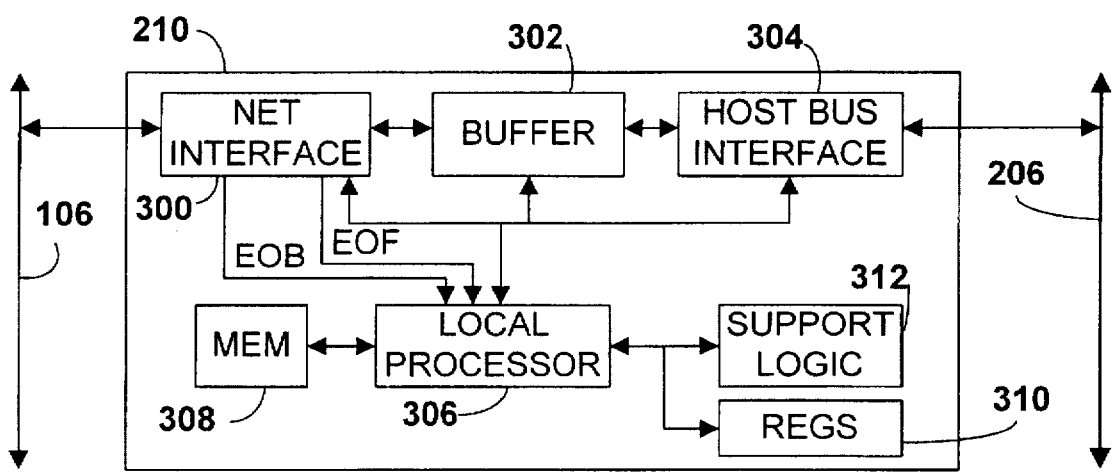
FIG. 3 is a more detailed block diagram of the network interface card for plugging into an I/O slot of the computer system of FIG. 2.

Referring now to FIG. 3, a more detailed block diagram is shown of the NIC 210. The NIC 210 includes net interface logic 300 for coupling to the segment 106 and a local memory buffer 302. The particular implementation of the net interface logic 300 depends upon the physical media of the segment 106 and the protocol used by the network 104. The net interface logic 300 is typically implemented to correspond to the Open Systems Interconnection (OSI) Reference Model and includes logic for implementing the physical interface with the cable segment 106. The physical interface includes circuitry for implementing a lower PMD (Physical Medium Dependent) layer, which is the lower layer of the physical interface, and an upper PHY layer, which defines the electrical interface. Signal-encoding and signal-decoding schemes are defined at the PHY layer, which mediates between a media access control (MAC) layer above it and the PMD layer below it. The MAC layer defines the frame formats and also the media-access method used by the network 104, and corresponds to the lower portion of the OSI Reference Model data-link layer.

The net interface logic 300 operates to detect and receive data from, and to assert data onto, the segment 106. In the embodiment shown, the data is in the form of packets or frames according to the token ring protocol. However, other types of protocols are contemplated, such as Ethernet 10Base-T, 100Base-TX, ARCnet, etc. Each data packet has a size ranging from several bytes to several kilobytes (Kbytes). For example, Ethernet packets may range up to 1.518 bytes, and token ring packets range up to 16 Kbytes or more. Each packet is serially communicated one bit at a time on the segment 106 by either the NIC 210 or the network 104 according to the particular protocol in use. Each data packet asserted on the segment 106 from the network 104 is retrieved by the net interface logic 300 and converted to the appropriate form for temporary storage in the buffer 302. The buffer 302 is preferably dynamic RAM (DRAM), although other types of memory are contemplated, such as static RAM (SRAM) or the like.

Eventually, the data from the network 104 stored in the buffer 302 is transferred to the main memory 204 through a bus interface device 304 provided on the NIC 210 for coupling to the I/O bus 206. The bus interface device 304 also receives data from the main memory 204 through the I/O bus 206 of the computer system 102 and stores the data into the buffer 302 in this manner, both the segment interface device 300 and the bus interface device 304 include circuitry for reading from and writing to the buffer 302. Both interface devices 300, 304 are typically implemented in hardware, and are preferably in the form of state machines. The bus interface device 304 may be implemented in any desired manner for transferring data between the NIC 210 and the computer system 102. In one embodiment, the bus interface device 304 operates as a bus master adapter for gaining control of the I/O bus 206 to perform direct memory access (DMA) transfers between the buffer 302 and the memory 204. In an alternative memory-mapped scheme, the host processor 200 controls data transfer, and the bus interface device 304 operates as a slave for transferring data between the buffer 302 and the memory 204.

The flow of data through the NIC 210 is controlled by a local processor 306 coupled to the interface devices 300, 304 and the memory buffer 302. The processor 306 typically includes a local memory 308 for storing start-up and driver routines for execution of the processor 306, as well as for storing data and parameters. The memory 308 includes both read only memory (ROM) and RAM portions. The processor 306 is also coupled to one or more registers 310 for control purposes as well as support logic 312. The registers 310 enable passing of interrupt signals and status signals between the NIC 210 and the computer system 102. As illustrated by the timing diagram in FIG. 4, several blocks of data are transferred, one at a time, forming as a series of blocks 400 for each packet, where each block 400 typically has a fixed size. The block size is typically one Kbyte or 1,024 bytes, although the block size may be larger or smaller as desired. An end-of-block (EOB) signal is generated by the net interface logic 300 to the local processor 306 after each block 400 is transferred. Since the packet size varies, the number of blocks for each packet varies. Also, the final block 402 may be smaller than a full-sized block and is terminated by an end-of-frame (EOF) signal, which is also generated by net interface logic 300 and provided to the local processor 306. The EOF signal designates the end of the frame or packet.

In typical token ring schemes prior to the present invention, an entire block of data was written into the buffer 302 for temporary storage before being transferred to the main memory 204. FIG. 5A is a timing diagram illustrating one prior art scheme for transferring blocks of data, where the bus interface device 304 is configured to perform DMA transfers. Each block of data for each packet from the segment 106 is written into a corresponding block of memory in the buffer 302 beginning at a time T0 and ending at a time T2 upon assertion of either the EOB signal or the EOF signal to the processor 306. At time T4 after some delay D1, the processor 306 is notified that a new block resides in the buffer 302 for transfer to main memory 204. Such notification is typically in the form of an interrupt. The processor 306 respondingly executes an appropriate interrupt routine or the like to set up the bus interface device 304 to initiate a DMA transfer of the current data block. The bus interface device 304 respondingly initiates the DMA transfer at time T6 after another delay D2. The DMA transfer is completed at time T8, and the host processor 200 is subsequently notified of the transfer at time T10 after another delay D3. Notification of the host processor 200 is handled by asserting an interrupt signal or executing a cycle on the I/O bus 206, which signal or cycle is transferred to the host processor 200 by the bus controller 208 or other logic.

Some delay or latency in the process described in FIG. 5A may be reduced if the driver routine has full control of the hardware. In particular, the delay D1 between times T2 and T4 may be reduced or eliminated by notifying the local processor 306 sooner, even before the completed transfer of the block to the buffer 302. The processor 306 may respondingly perform setup procedures for the DMA early, so that the DMA transfer by the bus interface device 304 may also be initiated earlier. In fact, it may be possible to eliminate the delay D2 between times T4 and T6, so that the DMA transfer begins at time T2, immediately after the block is in the buffer 302. However, this may require hardware modification, which would add an appreciable and thus undesirable expense. Further, the reduction of latency is not very significant since the delays D1 and D2 are not appreciably large compared to the entire cycle. The host processor 200 is still not notified of the transfer until after the sum of the time needed to fully transfer the block into the buffer 302, or from time T0 to T2, plus the time required to transfer the data from the buffer 302 into the main memory 204, or from time T6 to T8.

FIG. 5B is a timing diagram illustrating another prior art scheme for transferring blocks of data, where the bus interface device 304 is configured as a bus slave rather than being capable of performing DMA transfers. In this memory-mapped configuration, each block of data for each packet from the segment 106 is stored in the buffer 302 beginning at a time T20 and ending at a time T22 upon assertion of either the EOB or EOF signals. The time from T20 to T22 is about the same as the time from T0 to T2 for same-sized blocks. At time T24 after a delay D4, the host processor 200 is notified that a new block resides in the buffer 302 to be transferred to main memory 204. As before, notification of the host processor 200 is handled by asserting an interrupt signal or by executing a cycle on the I/O bus 206, which signal or cycle is transferred to the host processor 200 by the bus controller 208 or other logic. The host processor 200 respondingly begins executing a routine to transfer the data, which begins at a time T26 after another delay D5. This data transfer performed by the host processor 200 is completed at a time T28.

Since the host processor 200 performed the transfer in the memory-mapped scheme, it need not be further notified, thereby eliminating one delay D3 required in the DMA transfer. Nonetheless, the memory-mapped embodiment illustrated by FIG. 5B is generally less desirable than the DMA embodiment illustrated by FIG. 5A since the memory-mapped scheme requires participation by the host processor 200, thereby causing inefficiency and consumption of valuable processor resources. The total data transfer time required includes the time to transfer the data from the network 104 to the buffer 302, from time T20 to T22, plus the time to transfer the data from the buffer 302 to the main memory 204, from time T26 to T28, plus some notification and setup delays, such as delays D4 and D5.

Another prior art scheme (not shown) is known as pipelining. In brief, after data transfer is initiated into a buffer of a network adapter card implementing pipelining, a local processor or other hardware begins transferring the data to host memory sometime before the entire block is written into the local buffer. This reduces latency since the system need not wait until the entire block is written before starting the transfer to host memory. However, the hardware of the adapter card must be specifically designed to perform pipelining, so that modification of the firmware driver of non-pipelining adapter cards is not sufficient to add pipelining capability. Heretofore, pipelining systems have only been designed for Ethernet systems and are not known for token ring configurations.

Figure 6:
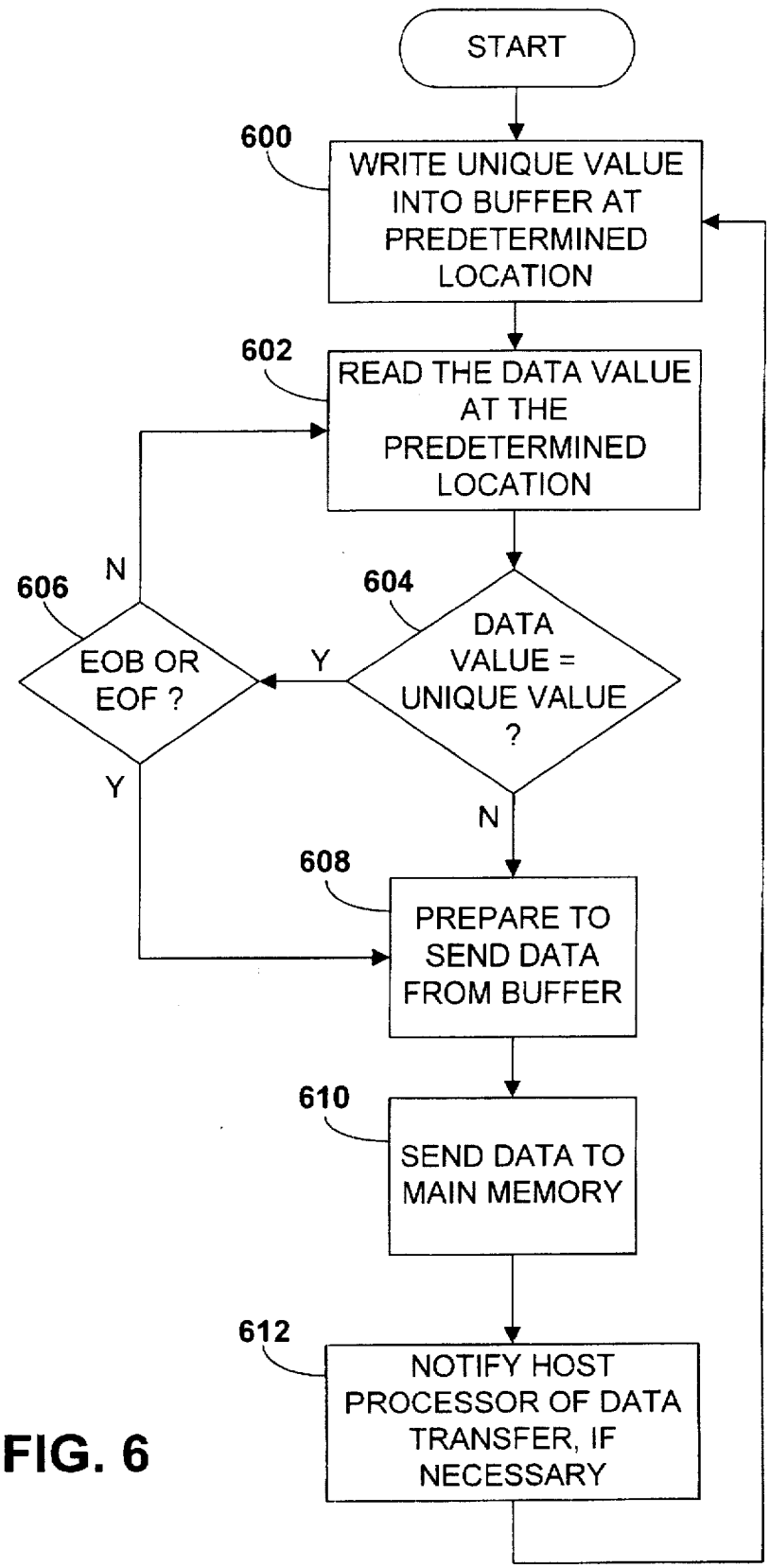
FIG. 6 is a flowchart diagram illustrating operation of the network system of FIG. 1 including the network interface card of FIG. 3 implemented according to the present invention.

Referring now to FIG. 6, a flowchart diagram is shown illustrating the network system 100 with the NIC 210 operating according to the present invention. A driver, implemented in software, firmware or the like, is modified according to the present invention and loaded into the memory 308 for execution by the processor 306. It is noted, however, that the present invention may be used in other network configurations for improving latency of data transfer. In a first step 600, the processor 306 writes a unique value into at least one block of memory within the buffer 302 at a predetermined data location before any data transfers from the network 104. If a transfer occurs from the computer system 102 to the network 104 thereby overwriting the unique value, the processor 306 detects such overwrite and re-writes the unique value into the buffer 302. The unique value may be arbitrarily defined, but is preferably a predetermined value ensuring uniqueness. Furthermore, the unique value may be one byte in length, but is preferably several bytes in length to ensure uniqueness and is written into several contiguous data byte locations in at least one block of memory of the buffer 302. The unique value may be written into several non-contiguous locations in the block of memory, thereby resulting in multiple unique values distributed within each block.

The predetermined location within the buffer 302 for writing the unique value determines the amount of reduction of latency of data transfer for each block of data. Although the predetermined location could be located at the end of each block of memory in the buffer 302, this would probably not reduce data transfer latency by an appreciable amount. Nonetheless, the predetermined location is located anywhere between the beginning and the end of one or more blocks of the buffer 302. In one embodiment according to the present invention as shown in FIG. 7A, the predetermined location 701 is located approximately in the center 704 of at least one block of memory 700 of the buffer 302. In another embodiment as shown in FIG. 7B, the predetermined location 701 is located at the very beginning 702 of each block of memory 700 in the buffer 302. As shown in FIG. 7C, the predetermined location 701 may also be at any position between the beginning 702 and the center 704 of each block of memory 700. Of course, the predetermined location may also be located in the second half of the block of memory 700 between the center 704 and the end 706. For example, the predetermined location is located $1/8$, $1/4$, $1/2$, $3/4$ etc. into at least one block of memory displaced from the beginning of that block.

In next step 602, the processor 306 is instructed to read the data value at the predetermined location where the unique value was previously written. The predetermined location is one or more contiguous or non-contiguous bytes located in the buffer 302, as described above.. In next decision step 604, the data value retrieved in step 602 is compared with the unique value. If the data value read in step 602 matches the unique value, then operation proceeds to decision step 606 to determine if either the EOB signal or the EOF signal has been asserted. If neither of the EOB or EOF signals are asserted, operation loops back to step 602 to read the data value again. If the data value read in step 602 does not match the unique value or if either of the EOB or EOF signals are detected asserted in step 606, then the unique value has been overwritten by data from the network 104. In either case, operation proceeds to step 608, where the processor 306 executes the appropriate procedures to prepare the bus interface device 304 to transfer data from the buffer 302 to the main memory 204.

In step 608, if the bus interface device 304 is configured to perform DMA data transfers, then the processor 306 initializes the bus interface device 304 to transfer the block of data currently being written into a corresponding block of memory within the buffer 302 by the net interface logic 300. Alternatively, for memory-mapped configurations, the local processor 306 in step 608 instructs the bus interface device 304 to request the host processor 200 to control transfer of the data from the buffer 302. In next step 610, the block of data being written into the buffer 302 is transferred to the main memory 204. This is performed by the bus interface device 304 for DMA systems or as controlled by the host processor 200 for memory-mapped systems. Of course, data transfer may be performed in any other manner as desired. Once data transfer is complete, operation proceeds to step 612, where the host processor 200 is informed of the data transfer to the main memory 204, if necessary. Operation then returns to step 600 from step 612 to re-write the unique data value at the predetermined location in the buffer 302.

In this manner, the buffer 302 is continuously or periodically polled to determine if the unique value is overwritten. It is noted that the unique value could be overwritten with an identical value in the new data, so that the new data is not detected in step 604. The pattern of the unique value is preferably chosen to reduce the possibility of being overwritten with an identical value. Further, the value may be several bytes in length and/or written in several non-contiguous locations to reduce the possibility of being overwritten with an identical value. Nonetheless, regardless of what the unique value is, it is still possible for it to be overwritten without detection. Monitoring the EOB or EOF values in step 606 ensures that the detection of new data occurs even if detection of the unique value being overwritten fails for any reason. Latency may not be reduced for that particular block since the EOB or EOF signal may signal a full block, yet such occurrences are statistically minimal and the effects negligible.

The transfer of data from the buffer 302 as indicated in step 610 of FIG. 6 begins before the EOB or EOF signal is asserted if the data value read in step 602 is not the same as the unique value. Thus, data transfer begins while the block is still being written by the net interface logic 300. In this manner, data transfer latency from the network 104 to the computer system 102 is substantially reduced. FIG. 8 is a timing diagram illustrating a system according to the present invention for transferring blocks of data from the buffer 302 to the main memory 204. Again, each block of data for each packet from the segment 106 is stored in the buffer 302 beginning at a time T30 and ending at a time T36 upon assertion of either the EOB or EOF signals. However, at a time T32, prior to time T36, the processor 306 detects that the unique value in the buffer 302 has been overwritten by the new block from the network 104. The processor 306 respondingly prepares the hardware to initiate transfer of the data. At time T34 after a slight delay, still before time T36, data transfer of the current block from the buffer 302 to the main memory 204 is initiated. The transfer to the main memory 204 completes at time T38, and the host processor 200 is notified at time T40, if necessary. Again, in memory-mapped configurations, the host processor 200 controls the transfer to the main memory 204 and need not be subsequently notified.

Comparison of FIGS. 5A and 5B with FIG. 8 reveals that the transfer of each block of data from the network 104 to the main memory 204 of the computer system 102 completes much faster with the present invention than schemes according to prior art. The elapsed time between times T30 and T36 of FIG. 8 corresponds to the times T0 to T2 and T20 to T22 in FIGS. 5A and 5B, respectively. Also, the elapsed time between times T34 and T38 of FIG. 8 corresponds to the elapsed time between times T6 and T8 or between times T26 and T28 of FIGS. 5A and 5B, respectively. Since the data transfer times overlap for a system according to the present invention as illustrated in FIG. 8, the total transfer time is less than the sum of elapsed time between T30 to T36 plus T34 to T38. Thus, the amount of latency is reduced at least by the elapsed time between times T34 and T36 as shown in FIG. 8.

It is now appreciated that a network system according to the present invention reduces data transfer latency when transferring packets using existing hardware. In this manner, the performance of the system is substantially improved with existing hardware. The present invention is particularly advantageous in token ring schemes where pipelining has not been heretofore implemented in hardware. Only the driver routine is modified to sense a new block of data being written and to begin transfer of the new block to host memory before the new block is completely written into the temporary buffer. Such overlap of transfer times reduces overall latency.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system for communicating with a network, comprising:

a host processor;

memory coupled to said host processor;

an interface bus coupled to said host processor; and a network interface device for coupling to said interface bus and the network for enabling communication between the computer system and the network, the network interface device including:

a buffer for temporarily storing data;

a media interface device coupled to said buffer and for coupling to the network for transferring data between said buffer and the network;

a bus interface coupled to said buffer and for coupling to said interface bus for transferring data between said memory and said buffer; and a local processor coupled to said buffer for writing a unique value at a predetermined location within said buffer, for periodically comparing a data value from said predetermined location with said unique value and for initiating data transfer from said buffer to said memory when said data value does not match said unique value.

2. The computer system of claim 1, wherein said buffer includes at least one block of memory storage.

3. The computer system of claim 2, wherein said predetermined location is located approximately in the center of said block.

4. The computer system of claim 2, wherein said predetermined location is located in between the beginning and the center of said block.

5. The computer system of claim 1, wherein said unique value comprises a plurality of bytes.

6. The computer system of claim 5, wherein said unique value is written into contiguous bytes of memory within said buffer.

7. The computer system of claim 1, wherein said media interface device is compatible with the token ring protocol.

8. The computer system of claim 1, wherein:
   said interface bus is an expansion bus for receiving at least one expansion card; and
   wherein said network interface device is an expansion card for plugging into said expansion bus.

9. The computer system of claim 1, wherein said network interface device further includes:
   local memory coupled to said local processor for storing a driver, wherein said driver instructs said local processor to write said unique value at said predetermined location within said buffer, to periodically compare said data value at said predetermined location with said unique value and to initiate data transfer from said buffer to said memory when said data value does not match said unique value.

10. The computer system of claim 1, wherein said local processor further indicates to said host processor when said data transfer from said buffer to said main memory is complete.

11. A network interface system for coupling to a computer system to enable communication between the computer system and a network coupled through a network media segment, comprising:
   a buffer for temporarily storing data transferred between the computer system and the network;
   a media interface device coupled to said buffer and for coupling to the media segment for transferring data between the network and said buffer;
   a bus interface device coupled to said buffer and for coupling to the computer system for transferring data between the computer system and said buffer; and
   a processor for detecting data in said buffer from the network, said processor writing a predetermined value at a predetermined location within said buffer, periodically comparing said data value at said predetermined location with said predetermined value, and initiating transfer of data from said buffer through said bus interface to the computer system if said data value is different from said predetermined value.

12. The network interface system of claim 11, wherein said buffer includes at least one block of memory storage.

13. The network interface system of claim 12, wherein said predetermined location is located approximately in the center of said block of memory storage.

14. The network interface system of claim 12, wherein said predetermined location is located in between the beginning and the center of said block of memory storage.

15. The network interface system of claim 11, wherein said predetermined value is a unique value comprising a plurality of bytes.

16. The network interface system of claim 11, further comprising:
   memory coupled to said processor for storing a driver routine, wherein said driver routine instructs said processor to write said predetermined value at said predetermined location within said buffer, to periodically compare said data value at said predetermined location with said predetermined value and to initiate data transfer from said buffer to the computer system when said data value is different from said predetermined value.

17. The network interface system of claim 11, wherein said processor further indicates to the computer system when said data transfer from said buffer to the computer system is complete.

18. A method of detecting data sent from a network to a network interface device in a computer system, comprising the steps of:
   writing a predetermined value at a predetermined location of a data buffer of the network interface device;
   periodically comparing a data value at the predetermined location with the predetermined value; and
   transferring data from the data buffer to the computer system when the data value at the predetermined location is different from the predetermined value.

19. The method of claim 18, after said step of writing a predetermined value, further comprising the step of reading the data value at the predetermined location.

20. The method of claim 18, after said step of transferring data, further comprising the step of indicating to the computer system after the data from the data buffer is transferred.

* * * * *